US012767325B2

(12) United States Patent
Okochi

(10) Patent No.: US 12,767,325 B2
(45) Date of Patent: Oct. 20, 2026

(54) ROTORCRAFT AND ROTOR BLADE PART

(71) Applicant: AERONEXT INC., Tokyo (JP)

(72) Inventor: Masaki Okochi, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/681,455

(22) PCT Filed: Aug. 6, 2021

(86) PCT No.: PCT/JP2021/029300
§ 371 (c)(1),
(2) Date: Feb. 5, 2024

(87) PCT Pub. No.: WO2023/013031
PCT Pub. Date: Feb. 9, 2023

(65) Prior Publication Data
US 2024/0336358 A1 Oct. 10, 2024

(51) Int. Cl.
*B64U 60/50* (2023.01)
*B64C 27/48* (2006.01)
*B64C 27/54* (2006.01)

(52) U.S. Cl.
CPC .............. *B64C 27/48* (2013.01); *B64C 27/54* (2013.01)

(58) Field of Classification Search
None
See application file for complete search history.

(56) References Cited

U.S. PATENT DOCUMENTS 2,478,847 A * 8/1949 Stuart ................. B64C 29/0033 244/233
7,874,513 B1 1/2011 Smith
9,199,733 B2 * 12/2015 Keennon ................. B64C 27/12
2007/0012818 A1 * 1/2007 Miyazawa ............. B64U 30/24 244/17.25
2018/0362146 A1 * 12/2018 Klein ..................... B64U 10/13
2020/0115045 A1 4/2020 Mermoz

FOREIGN PATENT DOCUMENTS

CN 110861771 A 3/2020
CN 113859521 A * 12/2021 ............. B64U 30/20
JP 2017071235 A 4/2017
JP 2018199444 A * 12/2018

(Continued)

OTHER PUBLICATIONS

English translation of JP 2018-199444 (Year: 2018).*

(Continued)

*Primary Examiner* — Kayla Mccaffrey
(74) *Attorney, Agent, or Firm* — HAUPTMAN HAM, LLP

(57) ABSTRACT

A function part is adaptable to flying vehicles with rotor blade parts of either the propulsion or traction type, while minimizing the reduction in efficiency of the flying vehicle. The rotorcraft has a rotor blade part including a motor and a propeller, a connection part connected to a rotating part of the rotor blade part and rotating together with the rotating part, and a function part that is at least partially held by the connection part and maintained at a reduced rotation speed than the rotation speed of the connection part during rotation of the connection part.

8 Claims, 20 Drawing Sheets

(56) References Cited

FOREIGN PATENT DOCUMENTS

| | | | |
|---|---|---|---|
| JP | 6841545 | A1 | 3/2021 |
| WO | 2016179827 | A1 | 11/2016 |

OTHER PUBLICATIONS

International Search Report dated Oct. 19, 2021 for International Application No. PCT/JP2021/029300.

First Office Action dated May 30, 2025 for Chinese Patent Application No. 202210695671.9.

Notice of Reasons for Refusal dated Jul. 31, 2025 for Japanese Patent Application No. 2023-539541.

* cited by examiner

ROTORCRAFT AND ROTOR BLADE PART

TECHNICAL FIELD

This invention relates to rotorcrafts and a rotor blade part with a functional part connected to a motor.

BACKGROUND ART

In recent years, efforts have been made to commercialize services using flying vehicles such as drones and unmanned aerial vehicles (UAVs; hereinafter collectively referred to as "flying vehicles"). Accordingly, there is a need to improve the performance and expertise of flying vehicles. The specifications required for flying vehicles vary depending on their purpose, which includes size, weight, and flight characteristics. In practice, emphasis is also given to improving the stability of flying vehicles not only during flight, but also during takeoff and landing. Patent Literature 1 discloses a flying vehicle capable of stable landing. (See, for example, Patent Literature 1).

In Patent Literature 1, a flying vehicle is provided in which the landing legs provided by the unmanned aircraft are located away from the center of the aircraft to enable stable landing, and the substructure of the unmanned aircraft equipped with landing legs is provided with a buffer for shock cushioning to prevent impact to the main body of the flying vehicle when the flying vehicle is landing.

PRIOR ART LIST

Patent Literature

[Patent Literature 1] WO2016/179827

SUMMARY OF THE INVENTION

Technical Problem

In Patent Literature 1, a landing is made without grounding the main body of the aircraft or its load on the landing surface by means of landing legs provided on the lower structure of a flying vehicle having traction-type (pull-type) rotor blades, and the landing legs are equipped with hydraulic and air dampers as buffers. This buffers the impact of the landing of the unmanned aircraft and reduces the impact transmitted to the main body of the aircraft and its load. The landing legs are installed at the bottom of a motor, which is the furthest away from the center of the airframe that can be connected without extending the frame for landing leg installation, and the distance between each landing leg is wider than that of the airframe with landing legs near the center of the airframe, thus providing a more stable landing.

In order to reduce the weight of the aircraft, which is necessary to improve fuel consumption and safety during flight, a method is disclosed in which the landing leg mounting seat can be omitted and the landing leg support members are directly attached to the arm or frame of the aircraft (hereinafter collectively referred to as the "holding part") to achieve weight reduction.

However, when using the method of attaching the support member of the landing gear directly to the fuselage holding part as described in Patent Literature 1, it is difficult to attach the landing gear to the lower part of the motor, which is located away from the center of the fuselage, because the motor and propeller are obstacles for the aircraft whose rotor blades are used for propulsion (pusher type). From the viewpoint of streamlining the propeller wake, the landing legs should be of a configuration that can be used for flying vehicles with propulsive rotor blades, since the propulsive type may be suitable for the configuration of the rotor blades of flying vehicles.

When installing landing legs on a flying vehicle with propulsive rotor blades, it is possible to achieve this by positioning the connection position so that they do not come into contact with the rotating propeller. However, if the propellers are avoided on the inside of the flight vehicle, the distance between landing legs becomes narrower, and landing performance deteriorates. Also, if the propellers are avoided on the outside of the flying vehicle, the frame will need to be extended to accommodate the landing legs, which may increase the size and weight of the flying vehicle.

Therefore, one object of this invention is to provide a functional part connected to a motor that improves the efficiency and landing stability of a flying vehicle when providing landing legs, etc., and that can be used for a flying vehicle with propulsive rotor blade parts.

Technical Solution

According to the invention, it is possible to provide a rotorcraft that includes a rotor blade part including a motor and a propeller, a connection part connected to a rotating part of the rotor blade part and rotating with the rotating part, and a function part that is at least partially held by the connection part and is held at a reduced rotational speed than the rotational speed during rotation of the connection part.

Advantageous Effects

The invention can provide a function part that can be adapted to flying vehicles with either propulsive or traction rotor blades, while reducing the efficiency loss of the flying vehicle.

EMBODIMENT OF THE INVENTION

A rotorcraft and rotor blade part with a function part connected to a motor, according to this embodiment, comprises the following.

[Item 1]

A rotorcraft, comprising:

a rotor blade part comprising a motor and a propeller;

a connection part connected to a rotating part of the rotor blade part and rotating together with the rotating part; and a function part that is at least partially held by the connection part and is maintained in a state of reduced rotation speed compared to the rotation speed of the connection part during the rotation of the connection part.

[Item 2]

The rotorcraft according to item 1, wherein the connection part is connected to the propeller side of the rotor blade part.

[Item 3]

The rotorcraft as in either item 1 or item 2, wherein the rotor blade part is propulsive.

[Item 4]

The rotorcraft as in any one of claims 1 to 3, wherein the function part is held in the connection part by means of an auxiliary member.

[Item 5]

The rotorcraft according to item 4, wherein the auxiliary member is a bearing structure.

[Item 6]

The rotorcraft as in any one of items 1 to 5, wherein the state in which the rotational speed is less than the rotational speed in the rotation of the connection part is substantially stationary.

[Item 7]

The rotorcraft as in any one of items 1 to 6, wherein the function part includes a grounding part that is in contact with the ground during landing.

[Item 8]

The rotorcraft as in any one of items 1 to 7, wherein the function part includes a propeller guard.

[Item 9]

The rotorcraft as in any one of items 1 to 8, wherein the function part includes a streamlining mechanism for the rotor blade part.

[Item 10]

A rotor blade part comprising a motor and a propeller, comprising:

a connection part connected to a rotating part of the rotor blade part and rotated together with the rotating part; and a function part that is at least partially held by the connection part and is maintained in a state of reduced rotation speed compared to the rotation speed of the connection part during the rotation of the connection part.

Details of the First Embodiment

The following is a description of a rotorcraft and rotor blade part with a function part connected to a motor according to this embodiment, with reference to the drawings.

Figure 1:
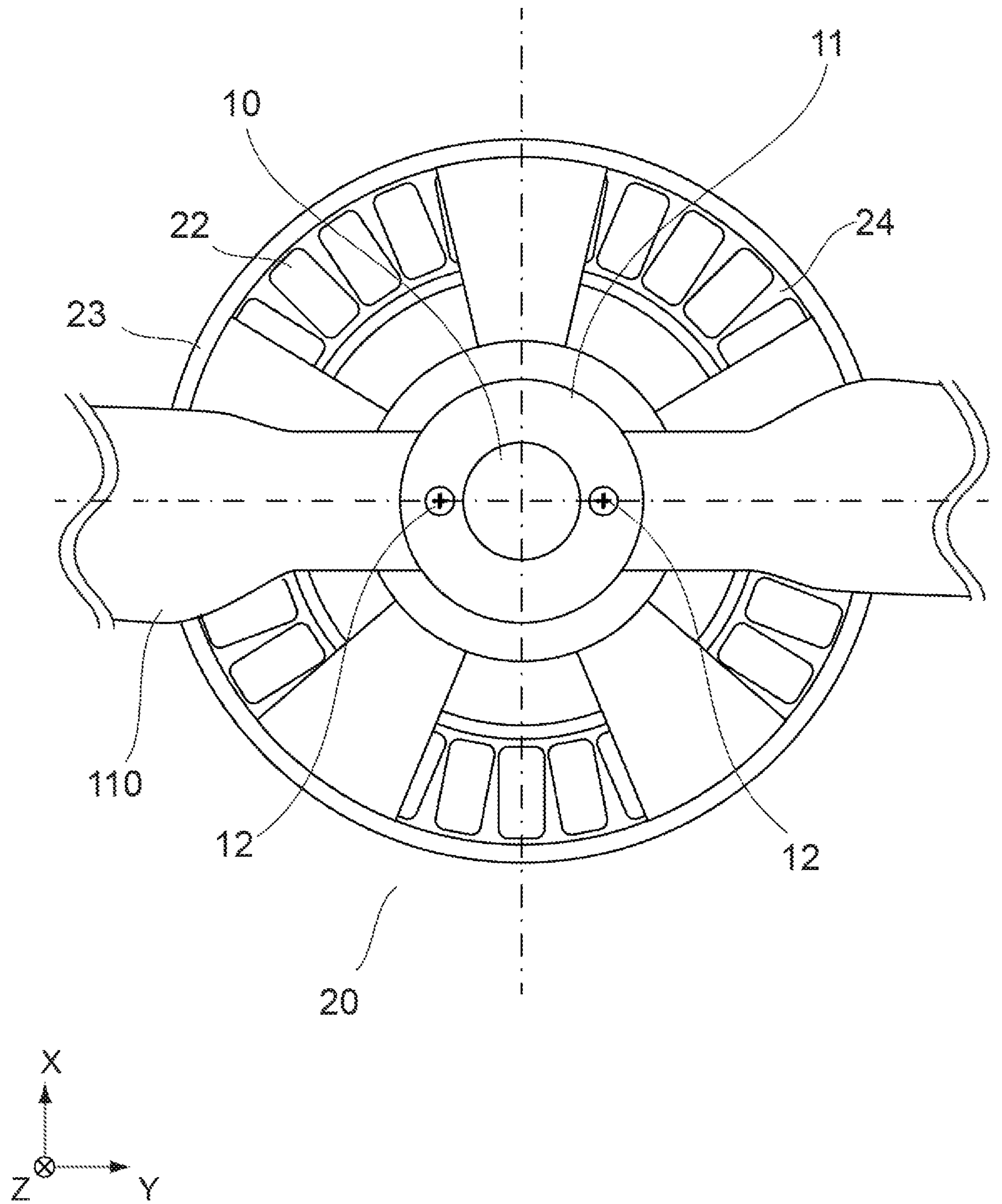
FIG. 1 is a conceptual view of a motor equipped with a flying vehicle according to the invention, viewed from the underside.
Figure 2:
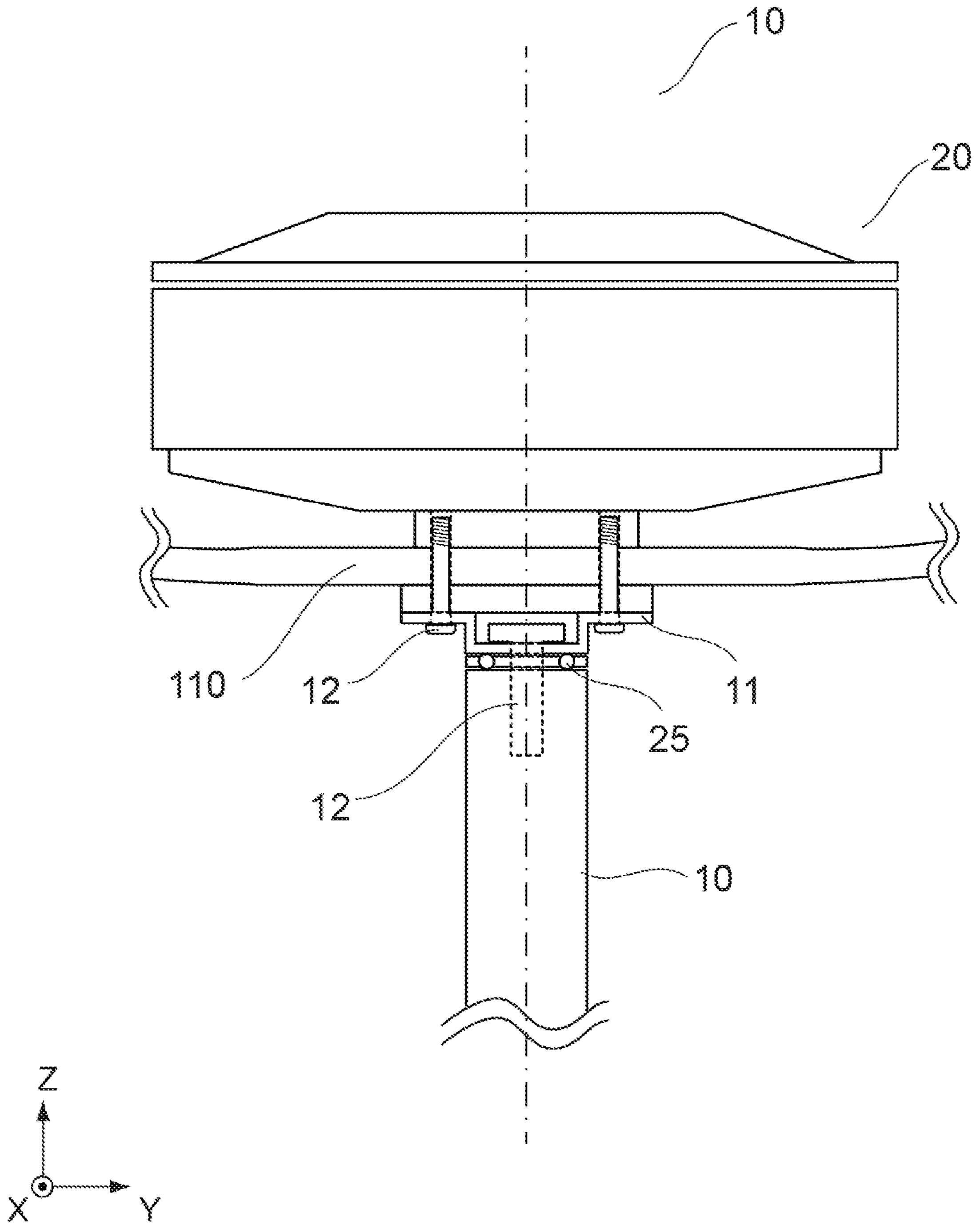
FIG. 2 is a side view of the motor of FIG. 1 connected to a propeller and a functional part.
Figure 3:
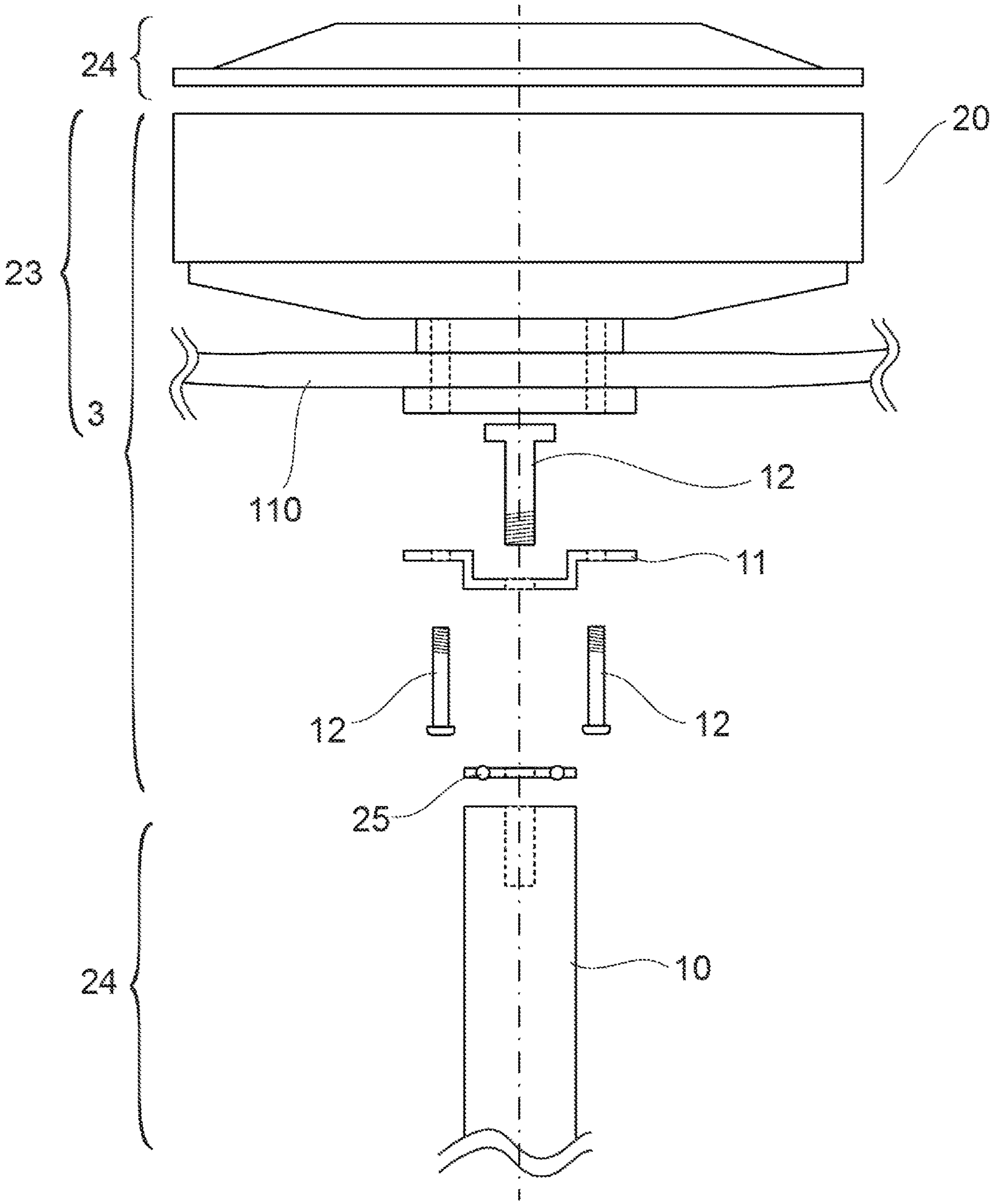
FIG. 3 is a conceptual view of the components of FIG. 2, disassembled and viewed from the side.

As illustrated in FIG. 1-3, a motor 20 provided by the flying vehicle according to this embodiment is connected to a propeller 110, which can be rotated by the rotation of the motor 20 to generate lift.

The motor 20 has a connection part 11 and a function part 10 that is connected in a manner that does not unintentionally drop out of the connection part 11, as illustrated in FIGS. 2 and 3.

Figure 4:
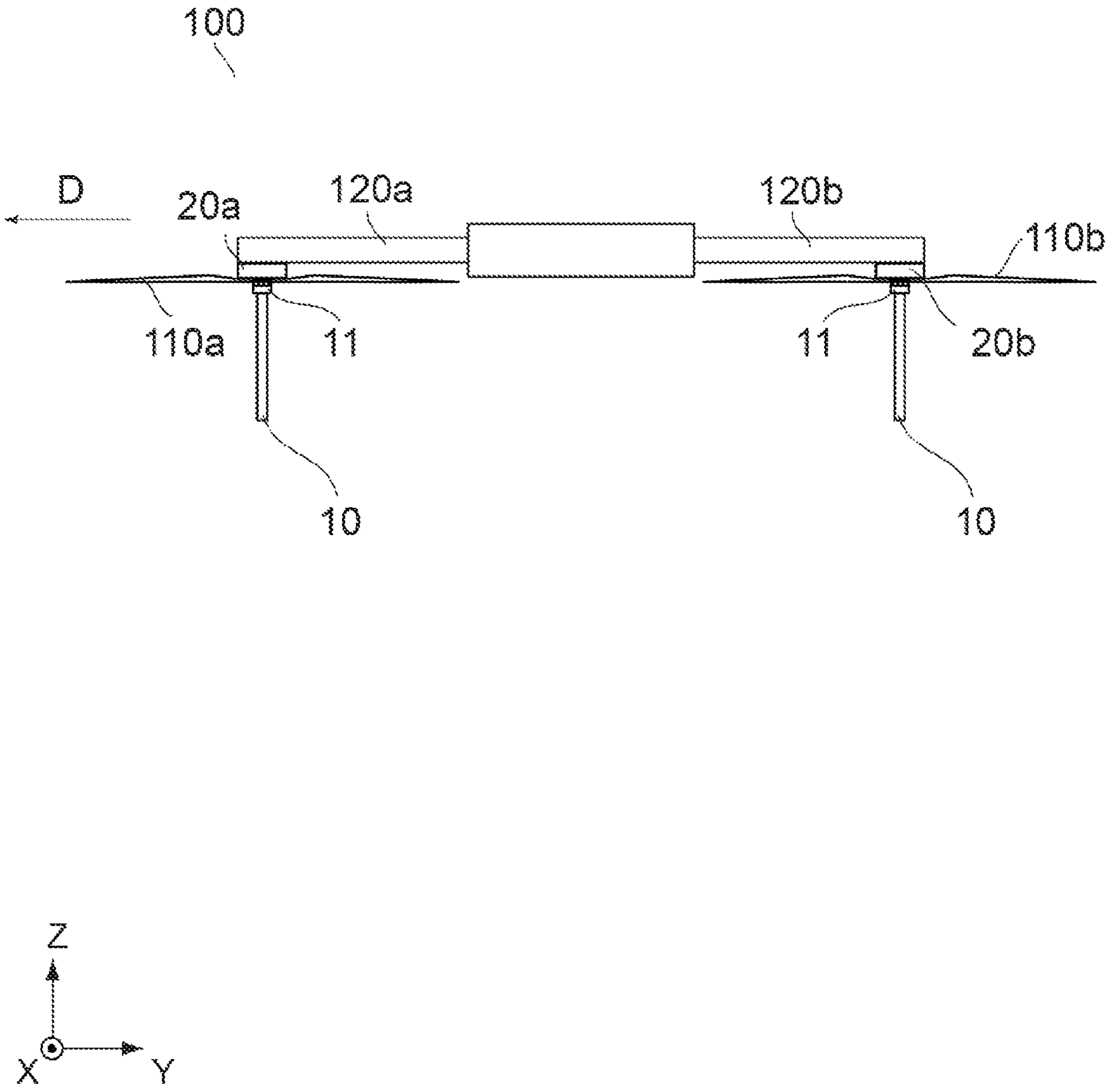
FIG. 4 is a side view of an embodiment of a flying vehicle according to the invention.
Figure 5:
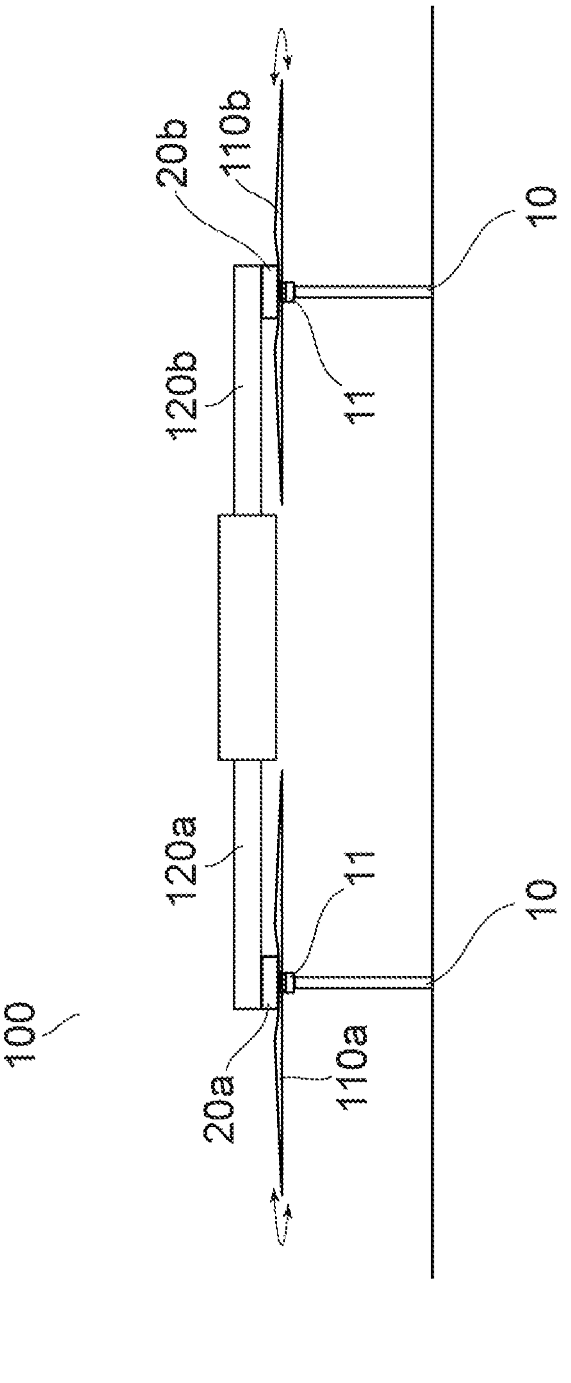
FIG. 5 is a view of the flying vehicle of FIG. 5 when it is landing.

The function part provided by the flying vehicle according to the first embodiment of this invention is connected to the motor 20 of the flying vehicle 100 via connection part 11 and is configured to protrude above the lift-generating surface by the propeller 110, as illustrated in FIG. 4-5.

The function part 10 is provided with auxiliary member 25 such as bearings or the like to reduce the effect of rotation, as described below. Therefore, the function part 10 is located directly under the motor 20 and is not affected by the rotation of the motor, making it suitable for landing legs and other applications. By doing so, in a flying vehicle that performs vertical takeoff and landing, such as the flying vehicle 100 in the first embodiment of this invention, when the function part 10 is a landing leg, the distance between the landing legs becomes wider and more stable when the flying vehicle contacts the landing surface.

Figure 7:
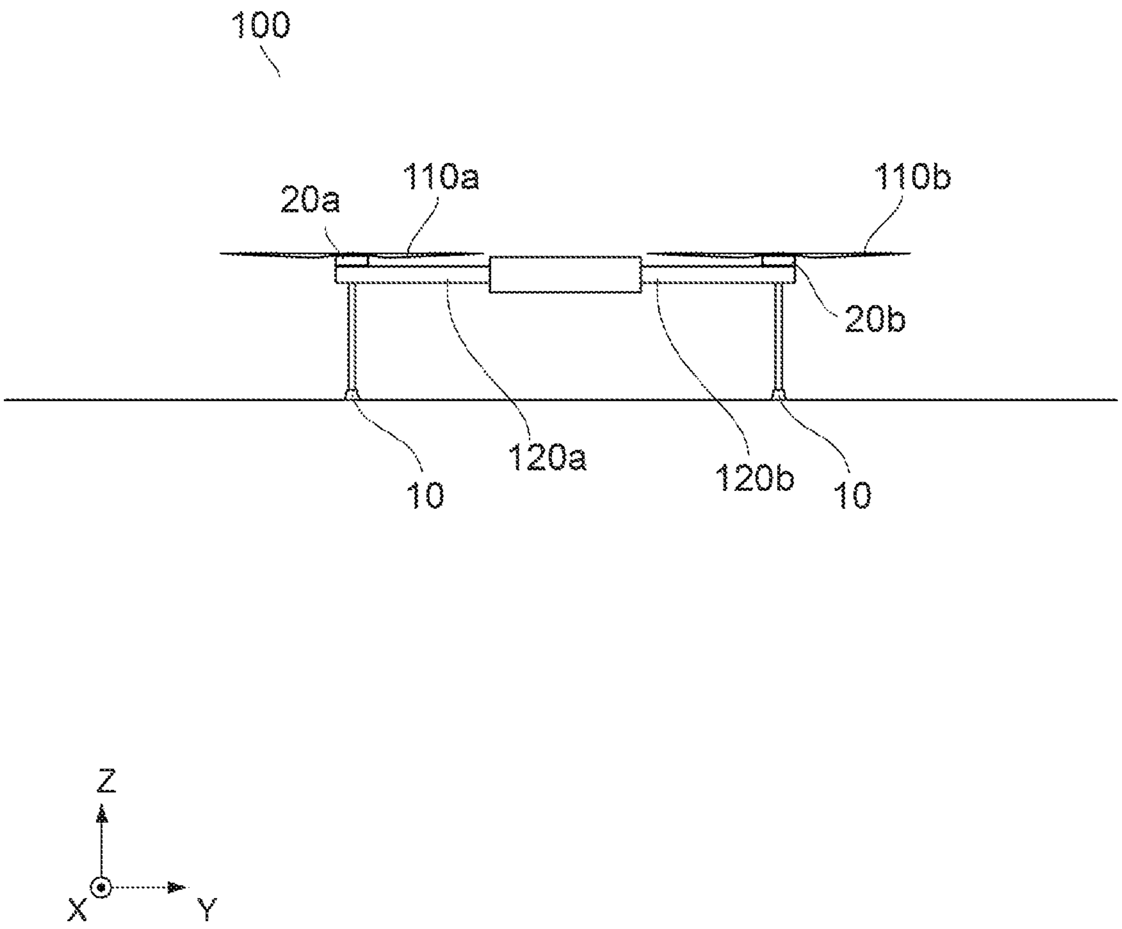
FIG. 7 is a view of a traction-type flying vehicle with a function part installed in the lower part of the motor.

That is, for example, as shown in FIG. 7, in the case of a traction-type rotor blade, the landing legs, which can be widely spaced without extending arms or other holding parts, can be located below the propeller and the motor connected to the propeller (hereinafter described as the lift-generating part), the holding part where the lift-generating part is installed, and the motor mount.

However, if the rotor blades are propulsive, existing methods do not allow the landing legs to be connected directly to the bottom of the motor or propeller.

Figure 8:
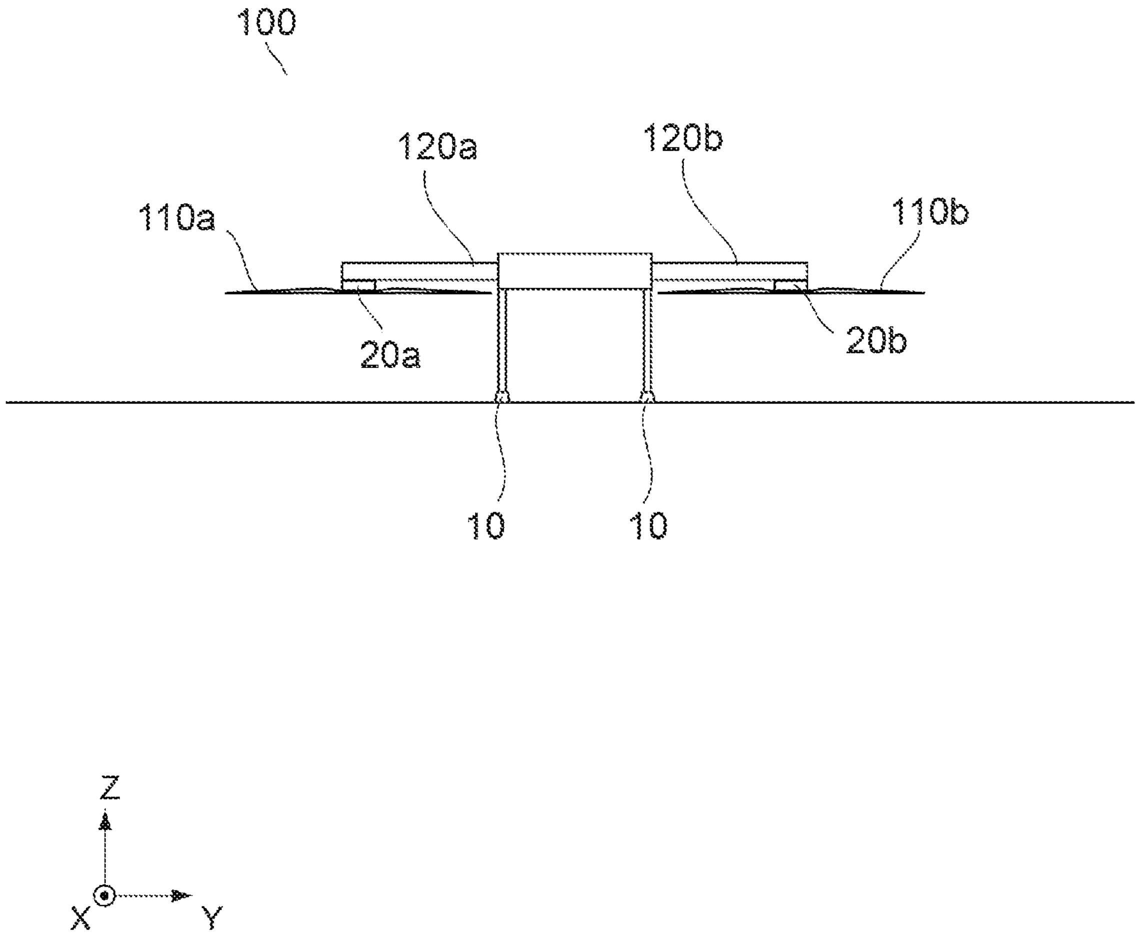
FIG. 8 is a conventional aircraft with a function part installed in a propulsion-type flying vehicle.
Figure 9:
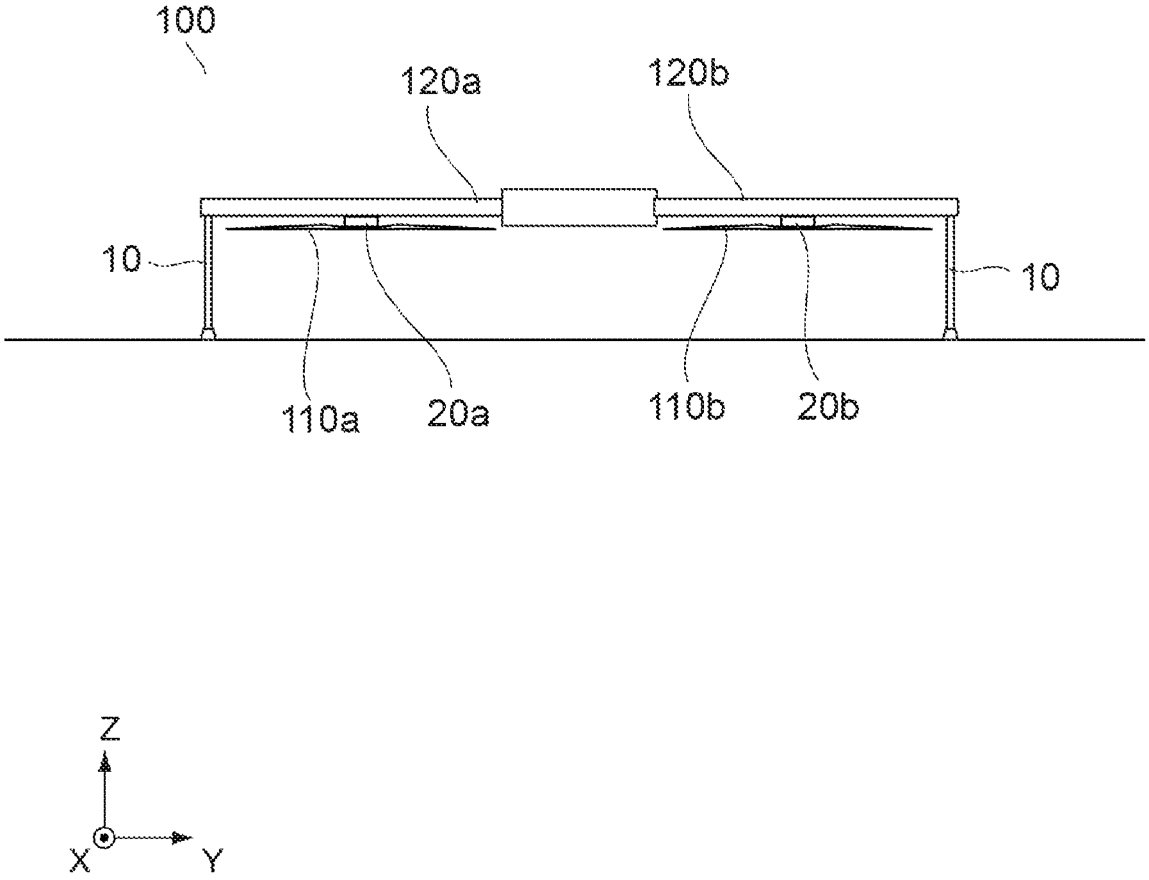
FIG. 9 is a conventional aircraft with a function part installed in a propulsion-type flying vehicle.

Therefore, landing legs must be installed avoiding the propeller rotating surface to avoid contact with the propeller, which is a propulsive type. If the landing legs are installed toward the center of the fuselage as shown in FIG. 8, the distance between the landing legs becomes narrower, and if they are installed toward the outside of the fuselage as shown in FIG. 9, the arms and other holding parts must be extended for the landing leg connection part. It is difficult to achieve both improved landing stability and increased aircraft efficiency.

Therefore, in the motor 20 provided by the flying vehicle in the invention, as illustrated in FIG. 1-5, by providing the connection part 11 that is fixedly connected to the motor 20, it is possible to provide the function part 10 below the lift-generating part even in the flying vehicle 100 having a propulsion-type rotor blade part. Also, by providing the connection part 11 and the function part 10 outside the motor, it is configured so that it can be used for various motor sizes.

The rotor blade part provided by the flying vehicle 100 has at least a motor 20 and a propeller 110, and may include assembly plates and screws if necessary. The parts that rotate due to the rotation of the motor (e.g., the propeller, shaft, and rotor portion of the motor) are collectively referred to as the rotating part 23, and the parts that do not rotate due to the rotation of the motor (e.g., the stator portion of the motor) are referred to as the non-rotating part 24.

The connection part 11 is fixedly connected to the rotating part 23 and rotates due to the rotation of the motor 20. On the other hand, as illustrated in FIG. 1-3, the function part 10, which is further connected to the connection part 11 through an auxiliary member 25, which allows the function part 10 to reduce rotation sped (more preferably remain unaffected) even when the rotating part 23 is rotating, and independently maintain a reduced rotation speed compared to the rotation speed of rotating part 23 (more preferably, remain in an substantially stationary state). Thus, in a flying vehicle 100 having propulsive rotor blade parts, the function part 10 does not rotate but remains stationary, so that it can be suitably used as a landing leg of the flying vehicle 100 below the motor 20 and is connected so that unintended dropout does not occur during flight or takeoff/landing of the flying vehicle 100.

While the function part 10 is in contact with an object that is not affected by the rotation of the motor 20 (e.g., a part in the flying vehicle excluding the rotating part 23, a structure around the flying vehicle, a landing surface, etc.), the frictional force acting between the object in contact and the function part can reduce the rotation speed and make the part substantially stationary. The frictional force required to reduce the rotational speed of the function part is reduced by the 25 auxiliary parts.

At the timing when the rotation speed of the function part 10 needs to be reduced or the function part 10 needs to stand still, friction may be caused by actively bringing an object into contact with the function part 10 to cause a reduction in rotation speed. For example, when the function part 10 is used as landing legs, the friction between the function part 10 and the landing surface causes the function part 10 to substantially come to rest when the landing is completed and thereafter. This prevents the landing legs from rotating and damaging or gouging the landing surface.

As illustrated in FIGS. 1-3, the auxiliary part 25 is used to connect the connection part 11 to the function part 10. It is a member with passive rotating and non-rotating parts that are independent of each other so that the rotation of the rotor blade part (motor 20, propeller 110, etc.) and the connection part 11 do not affect the function part 10. For example, they can be sleeves or bushings that are sliding bearings, ball bearings or roller bearings that are rolling bearings, etc. The passive rotating part of the auxiliary part 25 may rotate in response to rotation of the connection part 11, etc., while the non-rotating part of the auxiliary part 25 remains stationary, and the function part 10 may be connected to said non-rotating part.

When using a bearing structure, a lubricant such as grease or oil may be used between the connection part 11 and the function part 10, or the bearing may be made to have better sliding characteristics and quietness by using an oil-containing bearing.

The auxiliary member 25 should be determined by the size of the flying vehicle 100, its application, and the environment in which it is used. For example, when a rolling bearing is used, since a rolling element 25 such as balls or rollers, a holding part 26, a raceway disc 27, etc. are used, friction is reduced compared to a sliding bearing, and the bearing is strong against high-speed rotation, but the structure is more complicated, etc. In addition, when a sliding bearing is used, friction is greater than that of a rolling bearing, but the structure is simpler, and maintenance and other costs can be reduced.

An example of a member of the rotating part 23 that contacts the connection part 11 when it is connected may be, but is not limited to, a member comprising the propeller 110 of the rotor blade part, as illustrated in FIG. 1-3. The member of the rotating part 23 may also have a fixing member 12 (such as a screw) that connects the connection part 11 to the rotor blade, or a fixing member 12 (such as a screw) that connects the connection part 11 to the function part 10 via the auxiliary member 25. The function part 10 should be secured to the connection part 11 by the fixing member 12 so that it is not affected by the rotating part 23. In particular, when the fixing member 12 is a screw, the connection part 11 may be, for example, a convex downward configuration. When the connection part 11 is connected to the rotor blade part, a space is formed in which the head of the screw is housed, and the cylindrical part of the screw (the part without threads) is located at the penetration portion of the connection part 11, so that even if the rotating part 23 rotates, the fixing member 12 and the function part 10 can be configured so that the rotation has no effect. A bearing (such as a ball bearing or roller bearing that are types of rolling bearings) may be further provided in the penetration portion of the connection part 11.

When using the connection part 11, it is possible to add a function part 10, which is not affected by the rotation of the rotating part 23, to a typical motor or propeller. Since there is no need to use a dedicated motor, etc., it is expected to facilitate the addition of the function part 10 to existing flying vehicles and reduce the increase in production costs.

Figure 13:
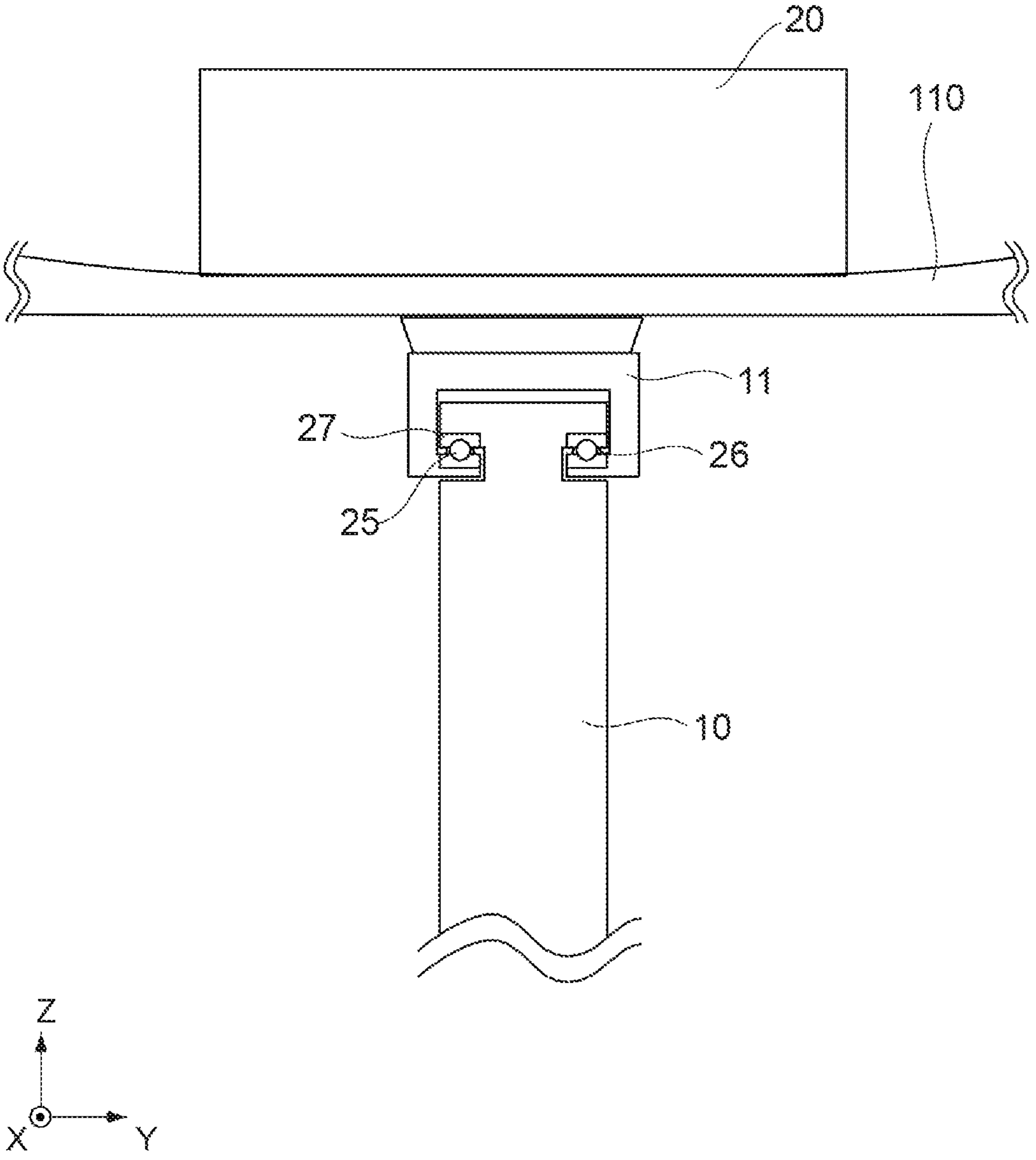
FIG. 13 is a side view of a connection part using a rolling bearing.
Figure 14:
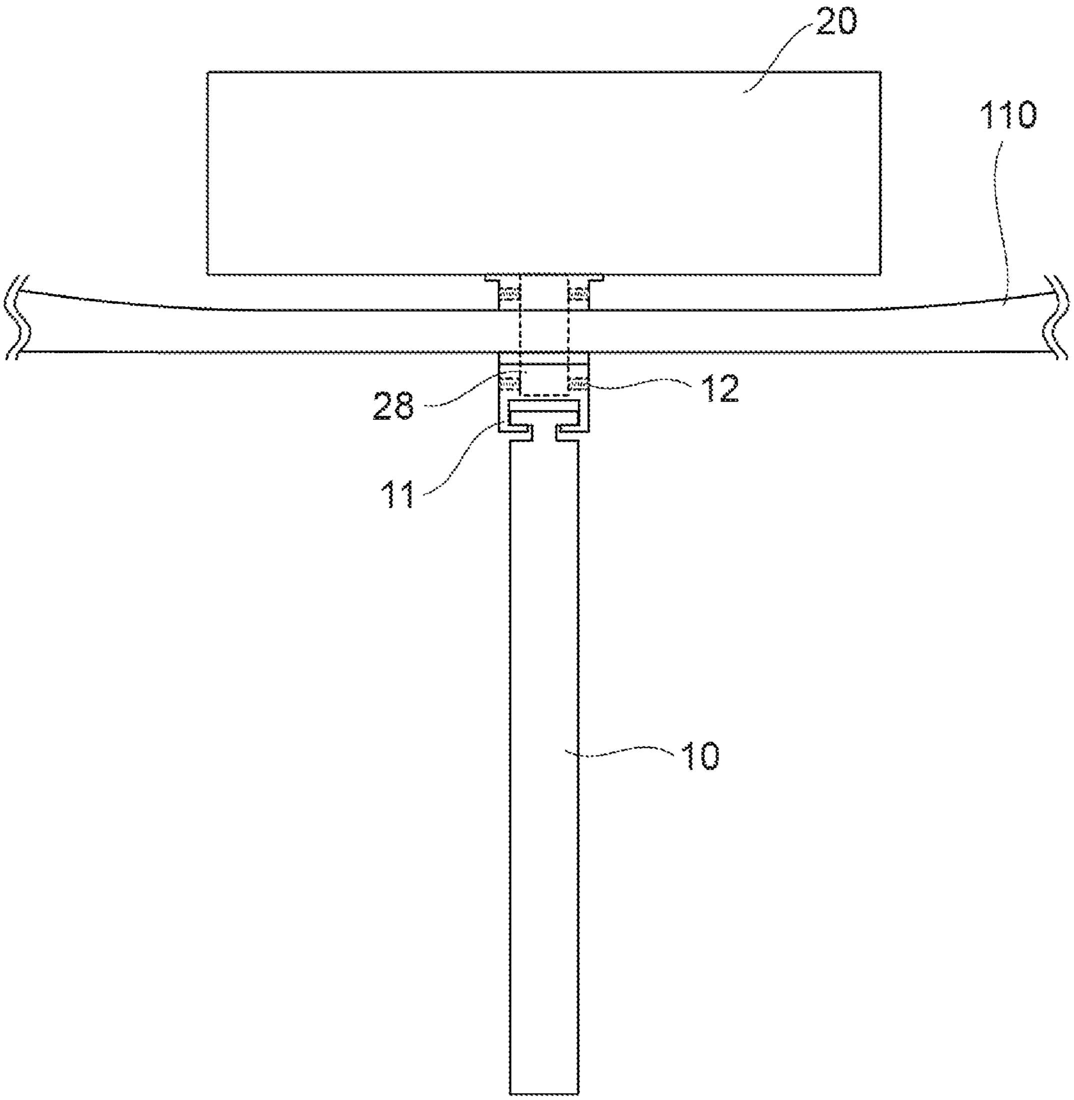
FIG. 14 is a view when the connection part is connected to a shaft.
Figure 15:
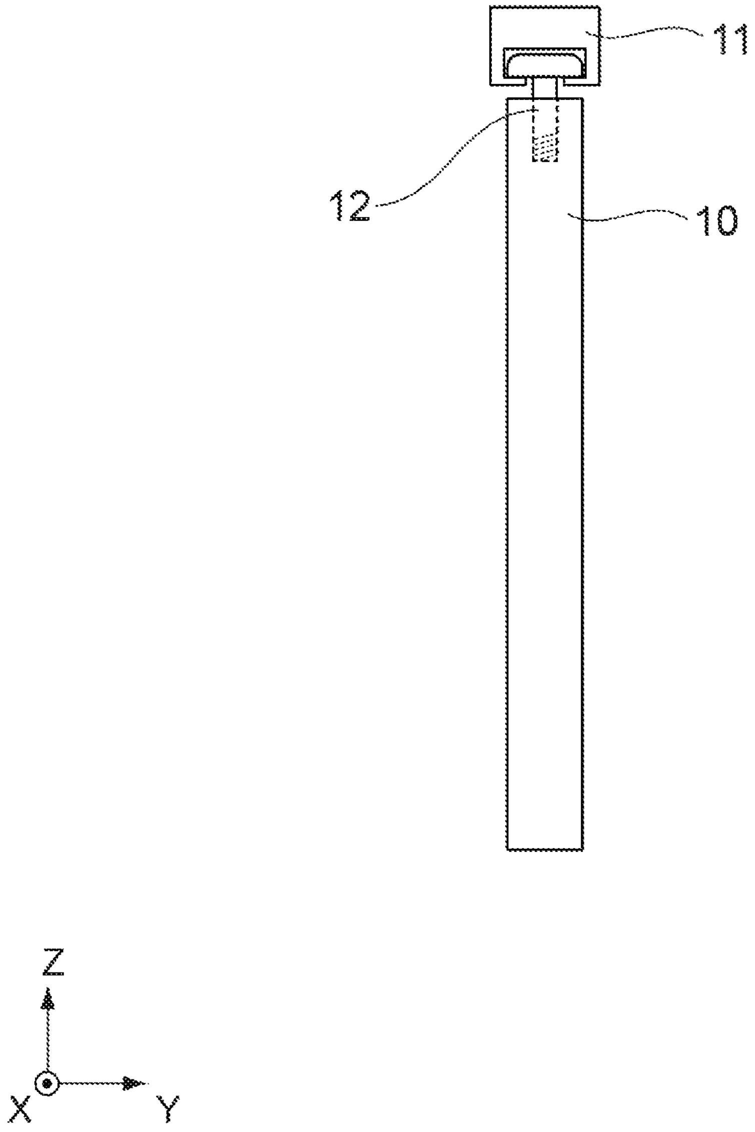
FIG. 15 is a side view of another example of the connection method of a motor and a function part according to the invention.

The function part 10 may be configured by digging a groove or the like in a part of the rod-shaped member as illustrated in FIG. 10-FIG. 14, and by processing the connection part 11 (e.g., deforming a single part or gluing or welding multiple parts), a part of the function part 10 is stored in the space in the connection part 11 and hooked to the penetration part. It may also be configured so that the head of the screw is stored in the space in the connection part 11 and held so that it is hooked onto the penetration part by fixing a fixing member 12 such as a screw to the rod-shaped member as illustrated in FIG. 2-3 and FIG. 15. This prevents the connection part 11 and the function part 10 from unintentionally separating during flight or takeoff/landing of the flying vehicle 100. Also, as illustrated in FIG. 13, in addition, it may be used in combination with the aforementioned auxiliary parts 25 (a rolling element, a holding part, raceway disc, etc.), or a surface finish that reduces friction may be applied to at least one of the connection part 11 or the function part 10 to prevent the rotation of the connection part 11 from being transmitted to the function part 10.

Figure 10:
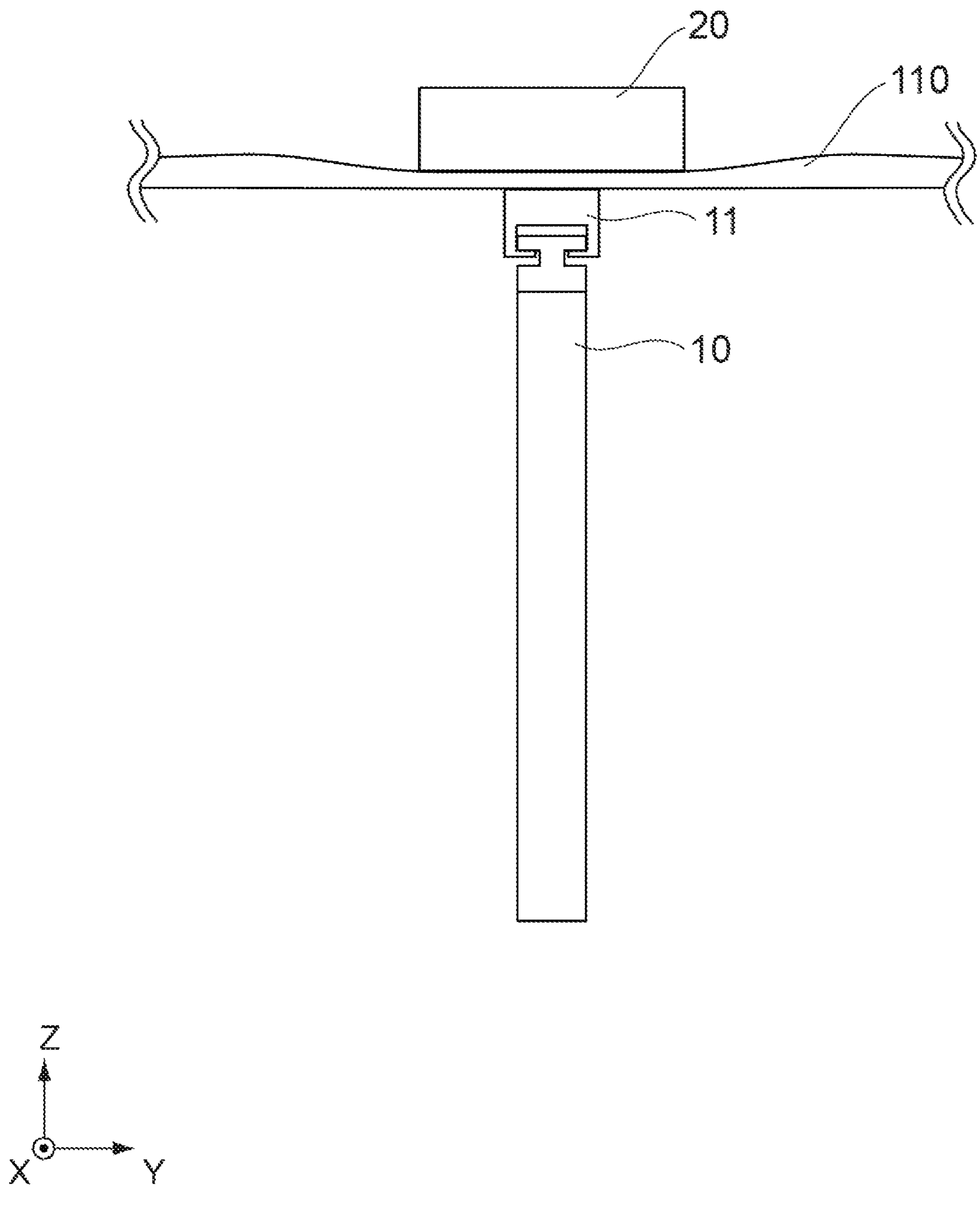
FIG. 10 is a side view of an example of the connection method of a motor and a function part according to the invention.
Figure 11:
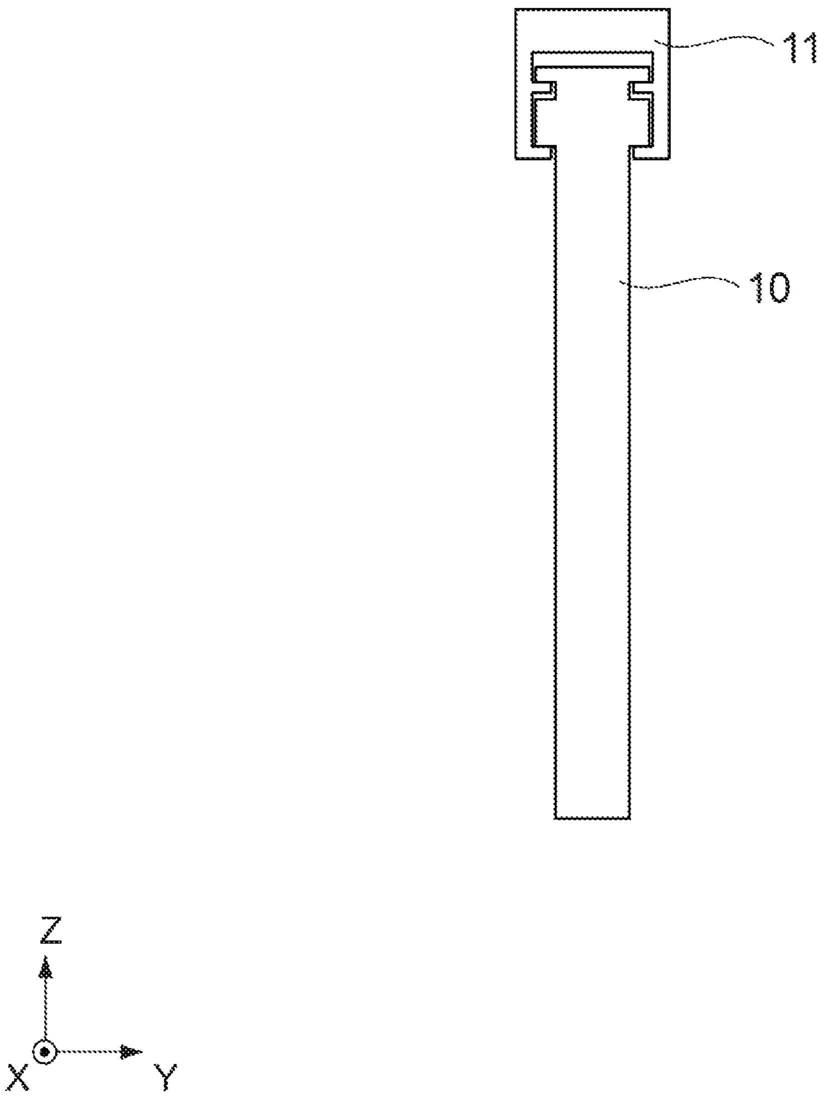
FIG. 11 is a side view and another view showing an example of the connection method of a motor and a functional part according to the invention.
Figure 12:
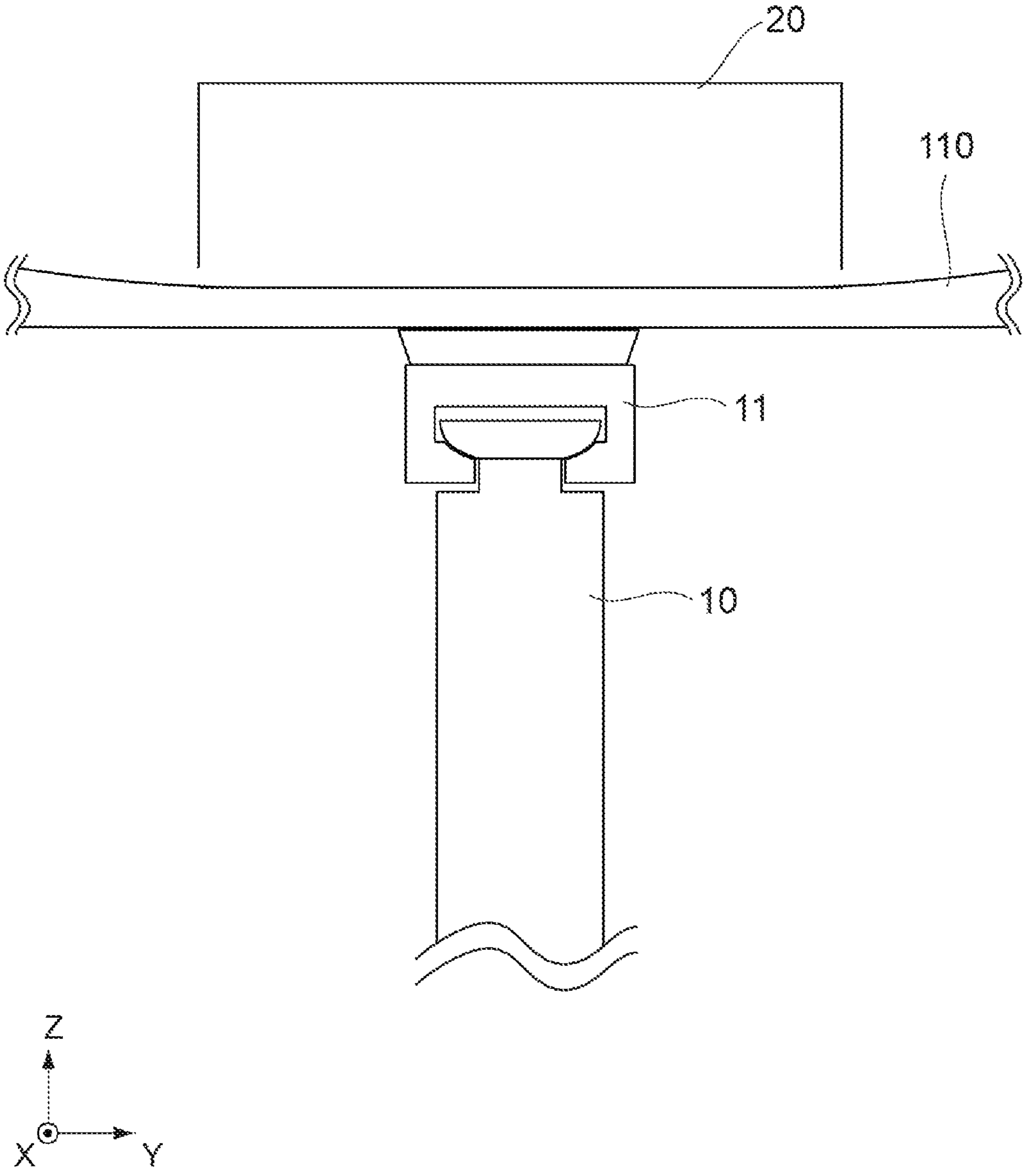
FIG. 12 is a side view when a sliding bearing is used for connection of the function part.

The function part 10 may be a combination of multiple members. For example, as shown in FIG. 10, by making a root member that is hooked to the connection part 11 and the tip end member (e.g., the grounding part as a landing leg) separate, it is possible to use materials suitable for the application and also to improve maintainability. When the function part 10 has the role of landing legs, during hard landing or contact with structures, in order to reduce the impact on the main body part of the flying vehicle and the contacting object, and to ensure that the rigidity and reliability of the connection part are not compromised, the root member may be made of a higher strength component material (e.g., metal or reinforced resin) compared to the component material of the part functioning as the landing legs (e.g., ABS resin or CFRP with low ply count). Such a configuration allows the landing leg portion to absorb shock by actively deforming or breaking the landing legs, thereby mitigating the shock transmitted to the main body part and contact objects.

When the function part 10 is to serve as landing legs, the function part 10 may be equipped with a grounding part that makes contact with the ground, and may also be equipped with dampers or other devices that provide shock mitigation when landing or placing the flying vehicle 100.

The function part 10 can have a variety of functions in addition to its action as a landing leg. For example, it can be used for additional functions of the aircraft such as propeller guards, nozzles, streamlining devices, lights, wheels, aerodynamic parts, antennas, and supporting members for the loads. It can be also designed to serve as a heat sink for the motor.

The function part 10 may be further configured to allow connection and replacement of multiple types of attachments according to requirements and other factors. When allowing replacement, the attachments should be standardized so that multiple types of attachments can be easily replaced.

Since the function part 10 can operate independently of the rotation of the motor 20, it is possible to perform a predetermined rotation or oscillation by a servo or motor provided separately from the motor 20. For example, the direction of the nozzle is changed or the angle of the aerodynamic part is changed.

The attachment connection of the mounting part can be easily replaced by providing well-known connection methods, such as connectors, screws, etc.

Figure 16:
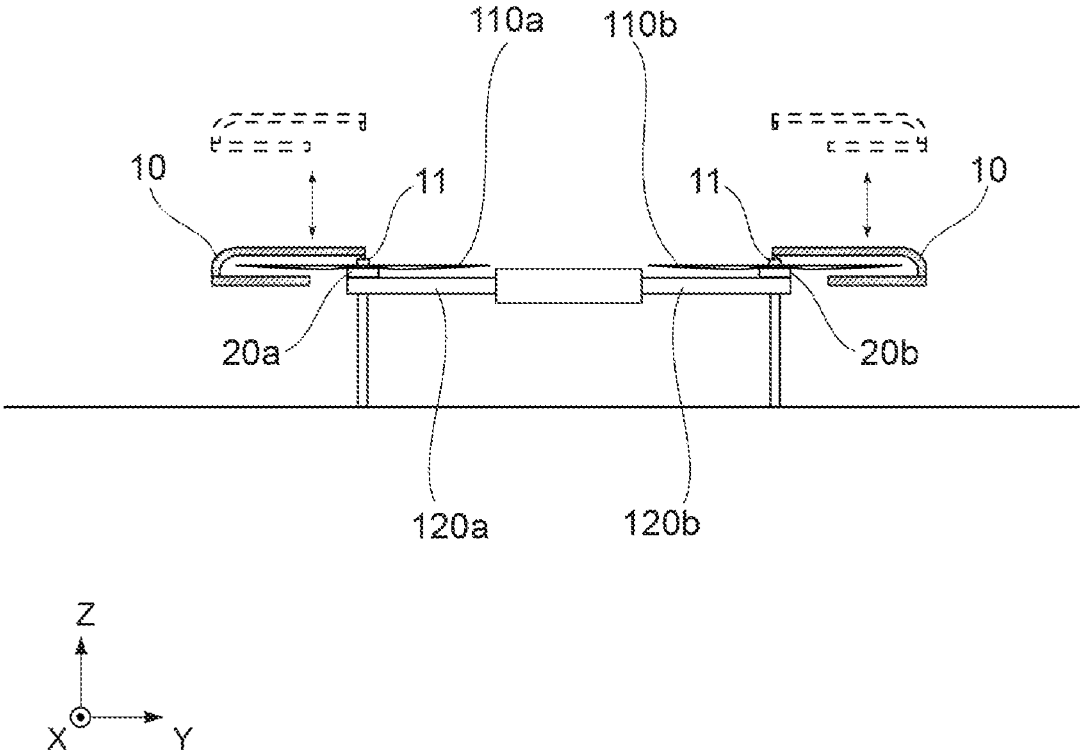
FIG. 16 is a side view of an example of a propeller guard as a function part of a flying vehicle according to the invention.
Figure 17:
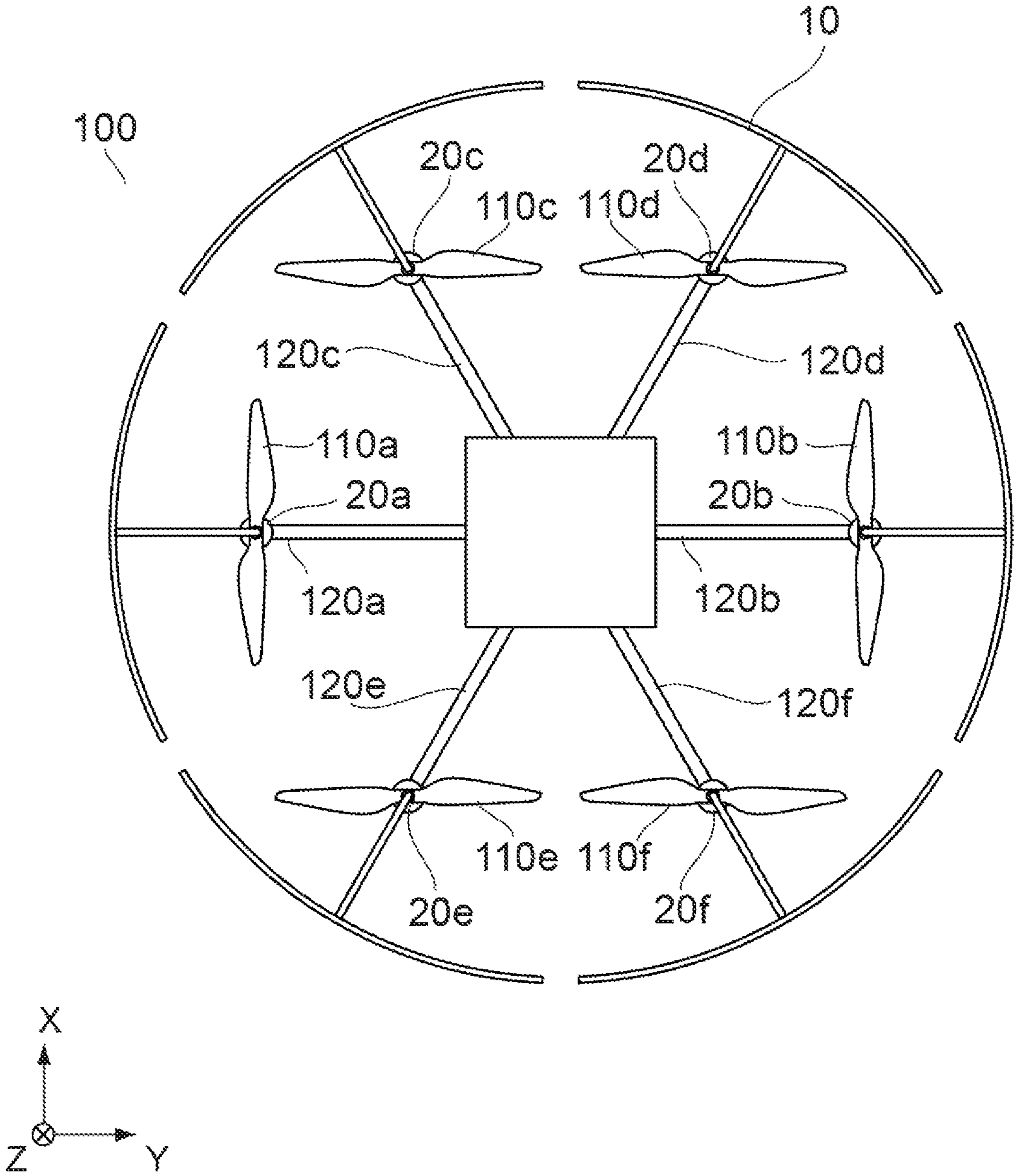
FIG. 17 is a top view of the flying vehicle of FIG. 14.

In the case of a function part 10 that acts as a guard for a flying vehicle 100 that uses a propeller for traction, the function part 10 connected to the motor 20 can be extended to cover the propeller and be above the flying vehicle 100, as illustrated in FIG. 16 and FIG. 17.

Figure 18:
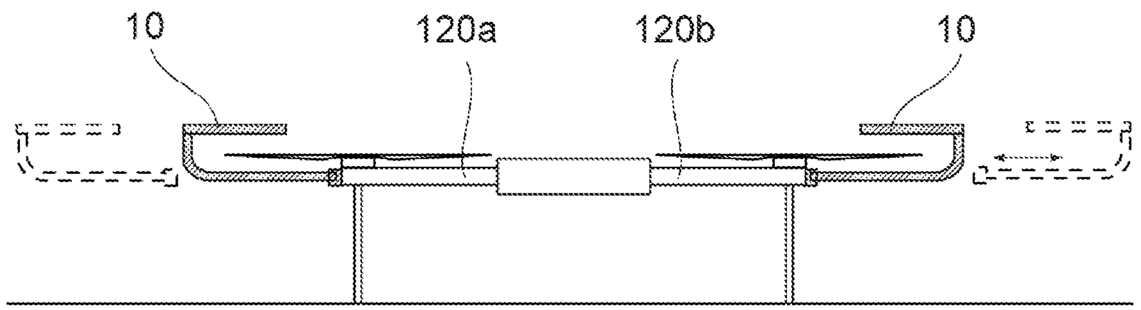
FIG. 18 is a side view of a flying vehicle according to existing technology with a propeller guard.
Figure 19:
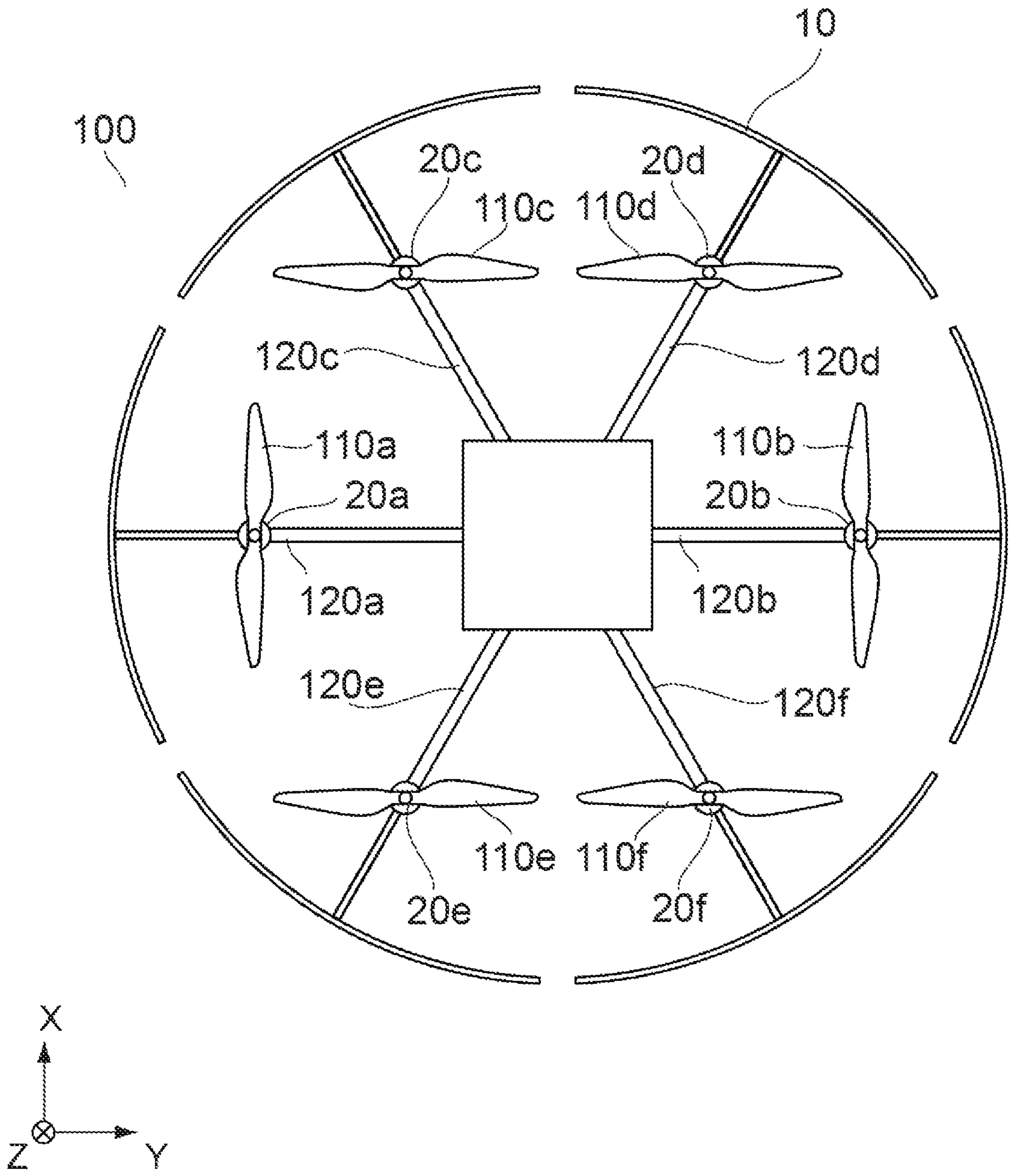
FIG. 19 is a top view of the flying vehicle of FIG. 15.

Since the guard can be accessed from the top of the flying vehicle for guard installation work, it is easier to install and remove the guard when the flying vehicle is on the ground, compared to installation from the side or from below, as shown in FIG. 18 and FIG. 19.

In the case of a flying vehicle that uses a propeller as a propulsion system, it is possible to provide a function part 10 with a guarding effect in a similar configuration, or even to combine it with other functions such as landing legs.

So far, we have described landing legs and propeller guards as examples of extending the function part below the motor of a flying vehicle with propulsion-type rotor blades or above the motor of a flying vehicle with traction-type rotor blades, i.e., to the connection part of the propeller. In function parts other than the previously mentioned examples, effects such as reducing the weight increase of the flying vehicle, improving the efficiency of the flying vehicle, and efficiently utilizing the propeller wake can also be anticipated.

Figure 20:
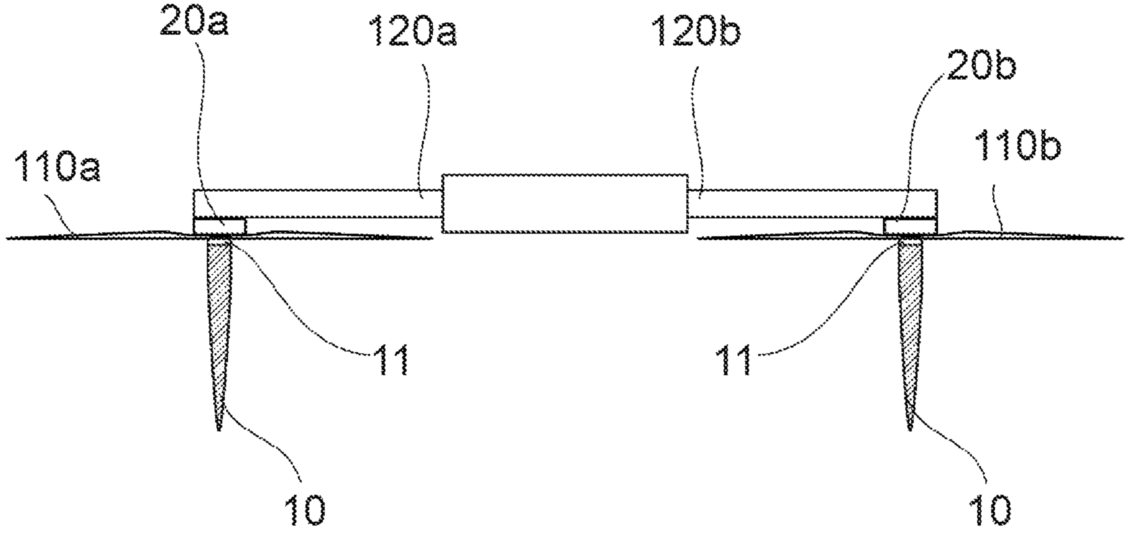
FIG. 20 is a side view of a flying vehicle according to the invention with a streamlining device as a function part of the flying vehicle.

When the propeller 110 equipped with flying vehicle 100 rotates, a propeller wake is generated. As shown in FIG. 20, by installing an airflow streamlining device on the side where the wake is generated, the generation of vortices in the wake, which leads to a decrease in flight efficiency, can be prevented and flight efficiency can be improved.

When the flying vehicle is a VTOL aircraft, the motor is used in the forward and backward directions during horizontal flight, etc., except during vertical takeoff and landing and hovering. At this time, the flying vehicle's flight efficiency is improved by installing an airflow streamlining device on the propeller connection side of the motor, which is in front of and behind the motor.

In designing a flying vehicle 100, it is common to mount the motor 20 connected to the propeller 110 and holding parts such as arms in a robust manner from the standpoint of expected loads. By mounting the landing legs, which are subject to loads during landing, near the motors and holding parts, the locations to be made robust can be concentrated, thereby reducing weight increase and center of gravity dispersion.

The flying vehicle 100 takes off from the takeoff point and flies to its destination. For example, when the flying vehicle conducts an inspection or survey, the flying vehicle reaches the destination, acquires information using sensors and other devices, and then heads to another destination or landing site.

As shown in FIG. 4 and FIG. 5, a flying vehicle 100 according to this embodiment has at least a main body part for flight, a plurality of rotor blade parts comprising a propeller 110 and a motor 20, and a flight part including elements such as a motor mount and a frame 120 supporting the rotor blade parts. And it should be equipped with energy (e.g., secondary batteries, fuel cells, fossil fuels, etc.) to operate them.

The flying vehicle 100 shown in the figure is depicted in a simplified form to facilitate the explanation of the invention's structure, and detailed components such as the control part, for example, are not shown in the figure.

The flying vehicle 100 is moving forward in the direction of arrow D (−Y direction) in FIG. (see below for details).

In the following explanation, the terms may be used according to the following definitions. Forward and backward: +Y and −Y, up and down (or vertical): +Z and −Z, left and right (or horizontal): +X and −X, forward direction (forward): −Y, rearward direction (backward) direction (backward): +Y direction, ascending direction (upward): +Z direction, descending direction (downward): −Z direction.

The propeller 110 rotates under the output from the motor 20. The rotation of the propeller 110 generates propulsive force to take the flying vehicle 100 off from the starting point, move it, and land it at the destination. The propeller 110 can rotate to the right, stop, and rotate to the left.

The propeller 110 provided with the flying vehicle of the invention has one or more blades. Any number of blades (rotors) (e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) as the blades are moved through the air. The geometry of the blade/vane can be selected as appropriate to optimize the dynamic aerodynamic characteristics of the vane, such as increasing lift and thrust and reducing drag.

The propeller provided by the flying vehicle of the invention may be, but is not limited to, fixed pitch, variable pitch, and also a mixture of fixed and variable pitch.

The motor 20 produces the rotation of the propeller 110; for example, a drive unit can include an electric motor or an engine. The blades can be driven by the motor and rotate around the axis of rotation of the motor (e.g., the long axis of the motor).

The blades can all rotate in the same direction or independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and the control conditions (speed, direction of movement, etc.).

The flying vehicle 100 determines the number of revolutions of each motor and the angle of flight according to the wind speed and direction by means of a flight controller, propo/radio, etc. This allows the flying vehicle to perform movements such as ascending and descending, accelerating and decelerating, and changing direction.

The flying vehicle 100 can fly autonomously according to routes and rules set in advance or during the flight, or by using a propo/radio to control the flying vehicle.

Figure 6:
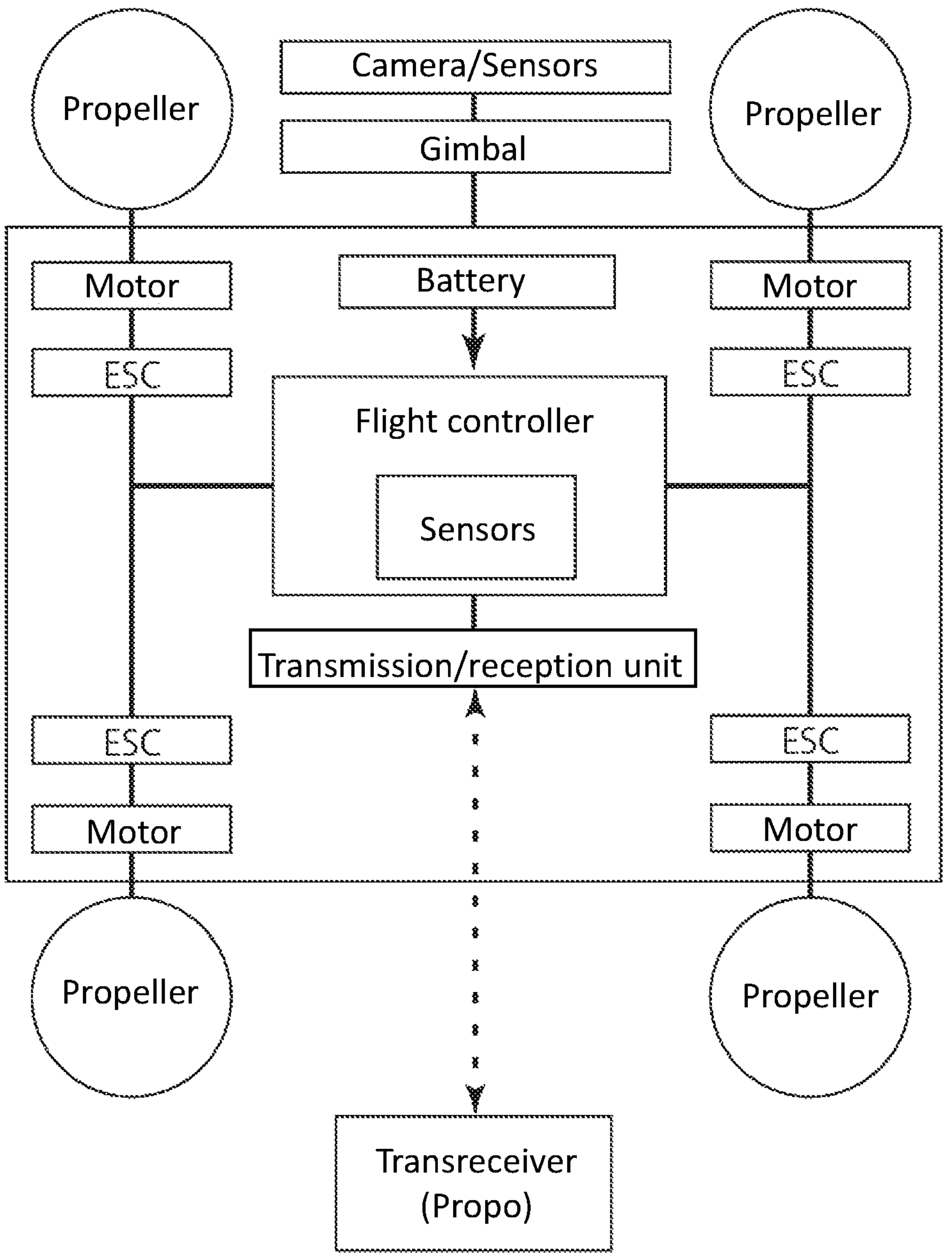
FIG. 6 is a functional block diagram of the flying vehicle of the invention.

The flying vehicle 100 described above has the functional blocks shown in FIG. 6. The functional blocks in FIG. 6 are a minimum reference configuration. The flight controller is a so-called processing unit. The processing unit can have one or more processors, such as a programmable processor (e.g., central processing unit (CPU)). The processing unit has a memory, not shown, which is accessible. The memory stores logic, code, and/or program instructions that can be executed by the processing unit to perform one or more steps. The memory may include, for example, a separable medium such as an SD card, random access memory (RAM), or an external storage device. Data acquired from cameras and sensors may be directly transmitted to and stored in the memory. For example, still and moving image data captured by a camera or other device is recorded in the internal or external memory.

The processing unit includes a control module comprising to control the state of the rotorcraft. For example, the control module controls the propulsion mechanism (e.g., motor or the like) of the rotorcraft to adjust the spatial arrangement, velocity, and/or acceleration of the rotorcraft having six degrees of freedom (translational motion x, y and z, and rotational motion θx, θy and θz). The control module can control one or more of the states of the loading part, sensors, or the like.

The processing unit is capable of communicating with a transmission/reception unit configured to transmit and/or receive data from one or more external devices (e.g., terminals, display units, or other remote controllers). The transceiver can use any suitable means of communication, such as wired or wireless communication. For example, the transmission/reception unit can use one or more of the following: local area network (LAN), wide area network (WAN), infrared, wireless, WiFi, point-to-point (P2P) network, telecommunications network, or cloud communications. The transmission/reception unit can transmit and/or receive one or more of the following: data acquired by sensors, processed results generated by the processing unit, predetermined control data, and user commands from a terminal or remote controller.

Sensors in this embodiment may include inertial sensors (accelerometers, gyroscopes), GPS sensors, proximity sensors (e.g., lidar), or vision/image sensors (e.g., cameras).

The plane of rotation of the propeller 110 provided by the flying vehicle 100 in this embodiment is at a forward inclined angle toward the direction of travel when advancing. The forward inclined rotating surface of the propeller 110 generates upward lift and thrust in the direction of travel, which propels the flying vehicle 100 forward.

The flying vehicle 100 may be equipped with a main body part that can contain a processing unit to be loaded, a battery, and other components. The main body part can optimize the shape of the flying vehicle 100 in its attitude during cruising, which is expected to be maintained for a long time during the movement of the flying object 100, and increase the flight speed, thereby efficiently reducing the flight time.

The main body part should have an outer skin that is strong enough to withstand flying and takeoff/landing. For example, plastic, FRP, etc. are suitable materials for the outer skin because of their rigidity and water resistance. These materials may be the same material as the frame 120 (including arms) included in the flight part, or they may be different materials.

The motor mount, frame 120, and main body part of the flight part may comprise connection parts. They may also be molded as one piece using a monocoque structure or integral molding (e.g., the motor mount and frame 120 may be molded as one piece, or the motor mount, frame 120, and all of the main body parts may be molded as one piece, etc.). By integrating the parts as one piece, the joints between each part can be made smooth, which is expected to reduce drag and improve fuel efficiency of flying vehicles such as blended wing bodies and lifting bodies.

The shape of the flying vehicle 100 may be directional. For example, the flying vehicle 100 may have a streamlined main body part that has less drag in a cruising attitude in no wind, or other shapes that improve flight efficiency when the nose of the flying vehicle is facing directly into the wind.

The above mentioned embodiments are merely examples to facilitate understanding of the invention and are not intended to be interpreted as limiting the invention. It goes without saying that the invention may be changed and improved without departing from its purpose, and that the invention includes its equivalents.

DESCRIPTION OF REFERENCE NUMERALS

10 Function part
11 Connection part
12 Screw
20*a*-20*f* Motor
21 Rotor
22 Coil
23 Rotating part
24 Non-rotating part
25 Rolling element
26 Holding device
27 Raceway disc
28 Shaft
100 Flying vehicle
110*a*-100*f* Propeller
120*a*-120*f* Frame

The invention claimed is:

1. A rotorcraft, comprising:

a rotor blade part comprising a motor, a propeller, and a rotating part configured to be rotated by the motor;

a connection part fixedly connected to the rotating part of the rotor blade part, the connection part configured to rotate together with the rotating part; and a function part that is at least partially held by the connection part and is maintained in a state of reduced rotation speed compared to a rotation speed of the connection part during the rotation of the connection part by the motor, wherein the function part is coupled to the connection part via an auxiliary member, the function part remains perpendicular to the rotorcraft throughout flight operation and ground operation, and the function part includes a grounding part that is in contact with the ground during landing.

2. The rotorcraft according to claim 1, wherein the connection part is connected to a propeller side of the rotor blade part.

3. The rotorcraft according to claim 2, wherein the propeller consists of a propulsive propeller.

4. The rotorcraft according to claim 1, wherein the propeller consists of a propulsive propeller.

5. The rotorcraft according to claim 1, wherein the function part is held in the connection part by means of the auxiliary member.

6. The rotorcraft according to claim 5, wherein the auxiliary member is a bearing structure.

7. The rotorcraft according to claim 1, wherein the function part is substantially stationary in the state of reduced rotation speed.

8. A rotor blade apparatus of a rotorcraft comprising a rotating part, a motor rotating the rotating part and a propeller fixed on the rotating part, comprising:

a connection part connected to the rotating part and rotated together with the rotating part; and a function part that is at least partially held by the connection part and is maintained in a state of reduced rotation speed compared to a rotation speed of the connection part during the rotation of the connection part by the motor, wherein the function part is coupled to the connection part via an auxiliary member, the function part remains perpendicular to the rotorcraft throughout flight operation and ground operation, and the function part includes a grounding part that is in contact with the ground during landing.

* * * * *